United States Patent [19]

Tonsor

[11] Patent Number: 4,881,786
[45] Date of Patent: Nov. 21, 1989

[54] TENSIONING AND RECOIL SYSTEM FOR A TRACKED VEHICLE

[75] Inventor: Andrew J. Tonsor, East Peoria, Ill.
[73] Assignee: Caterpillar Inc., Peoria, Ill.
[21] Appl. No.: 222,685
[22] Filed: Jul. 21, 1988
[51] Int. Cl.[4] ........................................... B62D 55/30
[52] U.S. Cl. ......................................... 305/10; 305/32
[58] Field of Search ...................... 305/10, 29, 31, 32; 180/9.1; 92/61, 65, 113; 188/269; 267/64.11, 64.13, 64.26, 113; 474/101, 109, 138

[56] References Cited

U.S. PATENT DOCUMENTS

| | | | |
|---|---|---|---|
| 2,412,885 | 12/1946 | Harmon | 267/64.11 X |
| 2,837,379 | 6/1958 | Selyem et al. | 305/9 |
| 2,837,380 | 6/1958 | Mazzarins | 305/9 |
| 3,101,977 | 8/1963 | Hyler et al. | 305/10 |
| 3,343,832 | 9/1967 | Gustafsson | 267/64 |
| 3,554,387 | 1/1971 | Thornhill et al. | 267/64.26 X |
| 3,645,586 | 2/1972 | Piepho | 305/10 |
| 3,787,097 | 1/1974 | Orr | 305/10 |
| 3,792,910 | 2/1974 | Kaufman et al. | 305/10 |
| 3,912,335 | 10/1975 | Fisher | 305/10 |
| 3,920,286 | 11/1975 | Bell | 305/10 |
| 3,980,351 | 9/1976 | Orr et al. | 305/10 |
| 4,223,878 | 9/1980 | Isaia et al. | 305/10 X |
| 4,413,862 | 11/1983 | Ragon | 305/10 |
| 4,457,564 | 7/1984 | Ruge et al. | 305/10 |
| 4,681,177 | 7/1987 | Zborowski | 180/9.56 |

FOREIGN PATENT DOCUMENTS

| | | | |
|---|---|---|---|
| 0986817 | 1/1983 | U.S.S.R. | 305/10 |
| 2093150 | 8/1982 | United Kingdom | 305/10 |

Primary Examiner—Russell D. Stormer
Attorney, Agent, or Firm—Claude F. White

[57] ABSTRACT

A tensioning and recoil system establishes and maintains a substantially constant force on an idler wheel of an endless track assembly for a tracked vehicle. The force applied to the idler wheel tensions the endless track and maintains a predetermined frictional force between the track and a powered drive wheel. The system also provides a recoil function for the idler wheel during ingestion of foreign material between the track and the idler and drive wheels. The tensioning and recoil system includes a recoil tube which telescopes into a cylinder and a single sealed and closed chamber filled with a compressible gas. Conventional recoil systems for self-laying track-type vehicle utilize pre-compressed large diameter steel coil springs to resist recoiling during light loading of the idler wheel and to return the wheel to the normal position after recoiling during heavy loading. These coil springs are quite heavy and bulky, require considerable space, and must be maintained in a pre-compressed state under large forces. This requires extremely strong retaining devices and special assembly and disassembly procedures. The subject tensioning and recoil system incorporates a compressible gas spring in place of the large coil steel spring, thereby requiring less space, less weight, and simplified assembly and disassembly. The subject system establishes and maintains a contant force on the idler wheel and the endless track and responds immediately to recoil situations.

9 Claims, 2 Drawing Sheets

TENSIONING AND RECOIL SYSTEM FOR A TRACKED VEHICLE

TECHNICAL FIELD

This invention relates generally to a tensioning and recoil system for the track assembly of self-laying endless track vehicles and more particularly to a tensioning and recoil system incorporating a telescoping cylinder having a single chamber filled with a compressible gas.

BACKGROUND ART

Many conventional earthmoving and construction vehicles utilize self-laying endless metallic track chain assemblies for supporting and propelling the vehicle. The segmented track chain is positively driven by a rear mounted sprocket wheel and guided by a front mounted idler wheel. Some type of subframe, pivotally secured to the vehicle main frame, supports a plurality of track guide rollers and the idler wheel. An idler recoil mechanism is normally incorporated into the subframe behind the idler wheel to provide a relief, or track recoil, function. The recoil mechanism normally utilizes a large steel coil spring which is held in a compressed state within the subframe. When debris, such as rocks or tree limbs, becomes lodged between the track and the idler wheel, or between the sprocket and the track, the idler wheel can retract rearwardly against the force of the compressed steel spring. The force, stored in the compressed spring, returns the idler wheel and track assembly back to their normal operating positions when the debris has passed out of the track assembly.

Conventional earthmoving vehicles, with endless steel track assemblies, are limited to relative low speed operation. Additionally, such vehicles are prohibited from traveling over or upon certain roadways because of the possible damage to the road surfaces by the steel tracks. Recent utilization of frictionally driven endless elastomeric track belts to replace the steel track assemblies has solved the problems of low speed operation and damage to road surfaces. However, conventional recoil and tensioning mechanisms are not satisfactory for the vehicles having frictionally driven endless elastomeric track belts.

A typical track idler recoil assembly for an endless steel track assembly of a track-type vehicle and the method for installation and removal of a recoil spring, is disclosed in U.S. Pat. No. 3,980,351 issued on Sept. 14, 1976 to Bobby J. Orr, et al. This assembly utilizes a large steel coiled compression-type recoil spring which is compressible between a spring housing and an hydraulic ram. The coil spring is maintained in its compressed state by a retaining member and a pushrod and the hydraulic ram connects the track idler to the compressed spring.

Another type of idler recoil and track adjuster spring retention arrangement, and the method of assembly and disassembly thereof, is disclosed in U.S. Pat. No. 3,920,286 issued on Nov. 18, 1975 to Francis D. Bell. This construction also uses a steel coil compression spring to provide idler recoil and use a threaded member to hold the spring in its compressed state. Both this patent and the above noted patent provide idler preloading and recoil operation using precompressed steel coil springs, which would appear to function satisfactorily for the track-type vehicles illustrated. However, both constructions are heavy and bulky, and require special methods of assembly and disassembly.

Another type of track idler recoil mechanism is described in U.S. Pat. No. 3,912,335 issued on Oct. 14, 1975 to George A. Fisher. This mechanism uses a combination of hydraulic and gas cylinders to replace the steel coil springs used in the previously noted patents. This construction is quite complicated and requires a considerable number of seals and closely machined mating piece parts.

The present invention is directed to overcoming one or more of the problems as set forth above.

DISCLOSURE OF THE INVENTION

In one aspect of the invention, a tensioning and recoil system for controllably resisting linear movement of a track guiding wheel of a track-type vehicle includes a frame member having a cylinder with the cylinder having an open end portion and a closed end portion, a piston having an open end portion and a closed end portion and being positioned within the cylinder and adjacent the closed end portion of the cylinder, and a recoil tube having an open end portion and a closed end portion and positioned within the cylinder with the open end portion telescopically receiving the open end portion of the piston. The piston and the recoil tube form a single sealed and closed chamber. The tensioning and recoil system further includes a wheel support member which is joined to the closed end portion of the recoil tube and which is adapted to rotatably support the track guiding wheel.

Adaptation of endless elastomeric belts to earthmoving, construction, and other work vehicles, in place of the conventional multi-jointed steel track assemblies, provides many advantages for the vehicles, including higher speed operation, a quieter operating machine, a smoother ride, and the ability to travel upon improved roadways. However, since the steel track assemblies are generally driven by engagement of powered sprocket teeth with portions of the track and the elastomeric belts are driven by frictional engagement of a powered wheel with the belt, tensioning and recoil requirements for each system are considerably different. For example, although the steel track assemblies require some predetermined degree of tension, they also require a specific amount of "track sag" for proper track adjustment. Therefore, during a recoil cycle and before any actual recoiling can take place, the "track sag" is eliminated. Also, the total amount of recoil movement in a steel track system is generally small, normally between 1 inch and 2 inches.

In contrast, the elastomeric belt track must be tightly tensioned at all times, with substantially no belt sag, because the belt is driven by friction between the driver wheel and the belt. Any decrease in the belt tension force could allow the belt track to slip with a resultant loss in machine mobility and power. Additionally, since there is no sag or looseness in the belt, recoil begins with very little buildup of debris between the belt and idler or drive wheels. It is also desirable to provide considerably more linear recoil movement in the elastomeric belt track than is possible in the steel track systems.

BEST MODE FOR CARRYING OUT THE INVENTION

Figure 1:
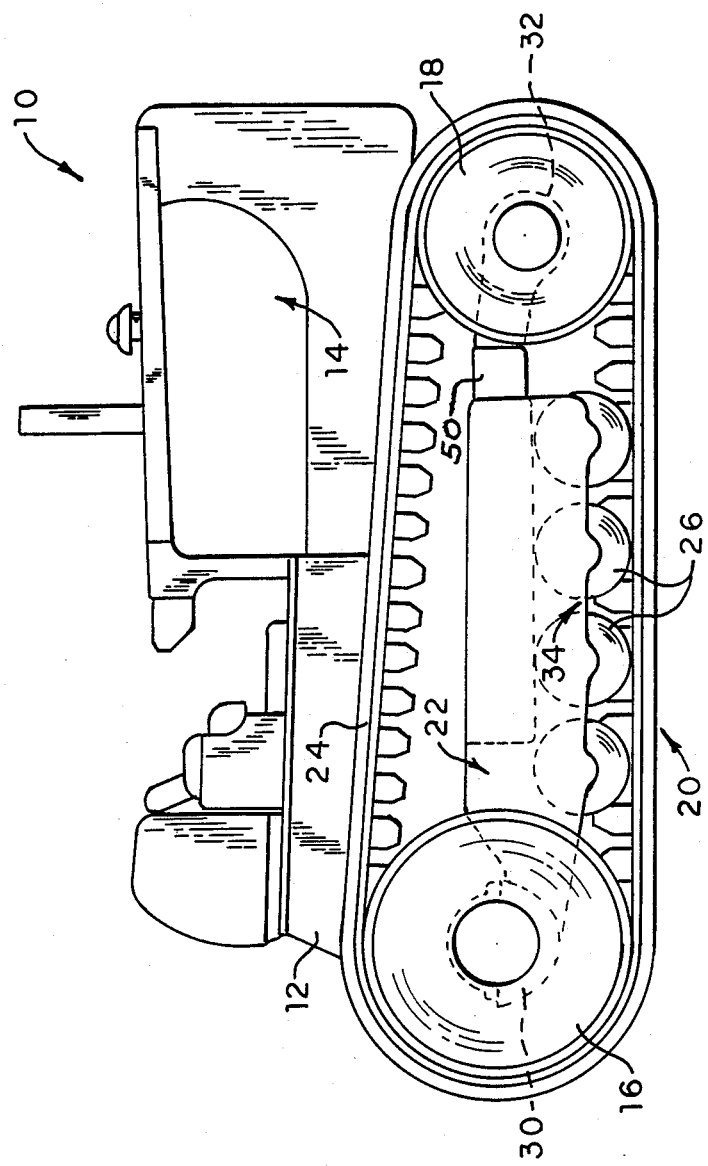
FIG. 1 is a diagrammatic side elevational view of a belted track vehicle incorporating the tensioning and recoil system of the present invention.

With reference to the drawings, and in particular FIG. 1, a belted track vehicle 10 includes a main frame 12, an engine 14, a friction drive wheel 16 powered by the vehicle, or an idler or track guiding wheel 18 spaced from the drive wheel, and an undercarriage assembly 20. It is to be understood that the drive wheel 16, the idler wheel 18, and the undercarriage assembly 20 are all duplicated on the opposite side of the machine illustrated. The undercarriage assembly 20 includes a roller frame assembly 22, an endless inextendable flexible ground engaging belt 24, a plurality of guide rollers 26, and a belt tensioning and recoil system 28, which maintains constant tension on the belt 24 and controllably resists linear movement of the idler wheel 18. The roller frame assembly 22 has a first end portion 30 connected to the drive wheel 16 and a second end portion 32 connected to the idler wheel 18. The belt 24 encircles and frictionally engages the drive wheel 16 and the idler wheel 18 and is driven by the frictional engagement of the drive wheel 16. The guide rollers 26 are rotatably secured to the lower portion 34 of the track roller frame assembly 22 and contact the belt 24 between the drive wheel 16 and the idler wheel 18.

Figure 2:
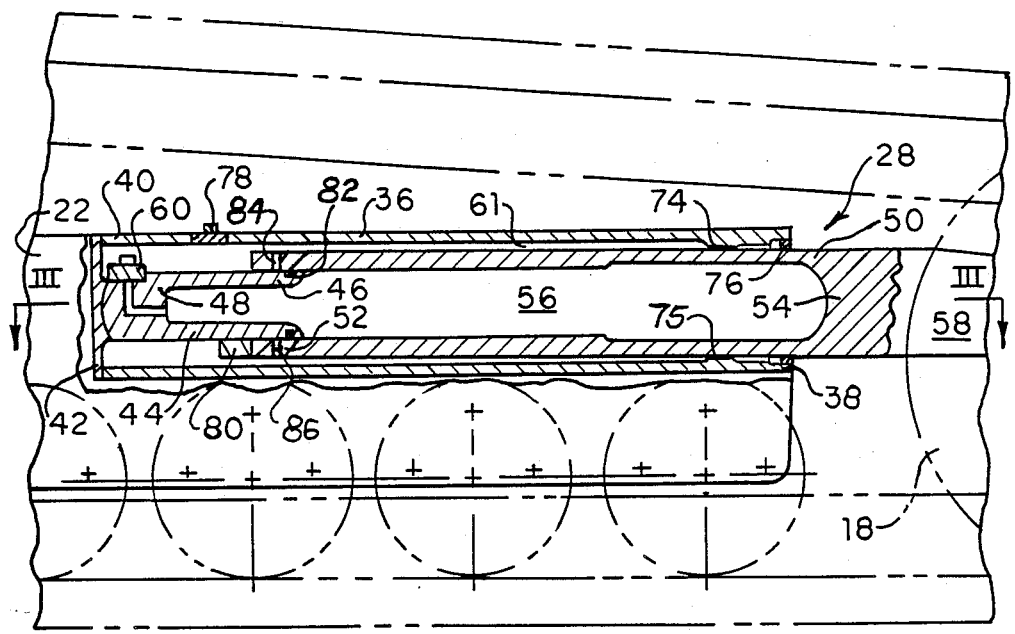
FIG. 2 is a diagrammatic side elevational view, partly in section and on an enlarged scale, of the tensioning and recoil system of the present invention.
Figure 3:
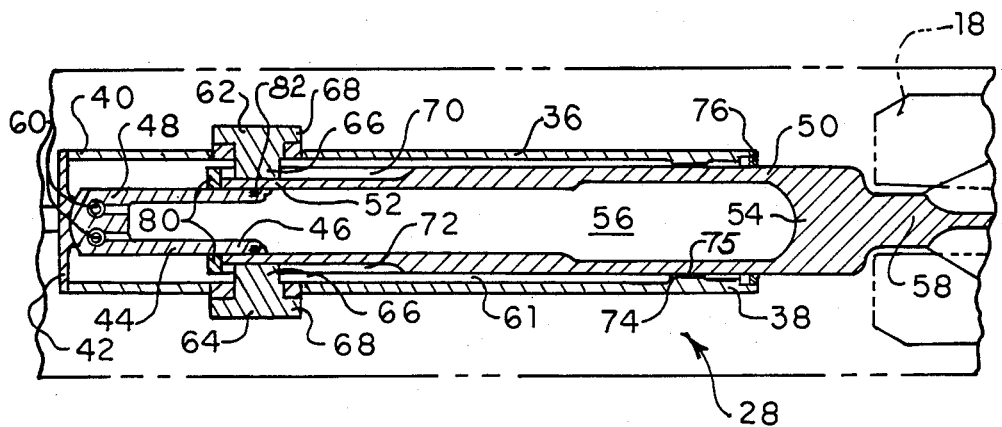
FIG. 3 is a diagrammatic sectional view taken generally along the lines III—III of FIG. 2.

With particular reference to FIGS. 2 and 3, the tensioning and recoil system 28 includes a cylinder 36 having a first open end portion 38 and a second closed end portion 40, including an end wall 42. The cylinder 38 forms a portion of the frame member 22. The recoil system 28 further includes a piston 44 which has a first open end portion 46 and a second closed end portion 48. The piston 44 is positioned within the cylinder 38 with the second end portion 48 in contact with the cylinder end wall 42. A recoil tube 50, having a first open end portion 52 and a second closed end portion 54, is positioned within the cylinder 36. The first end portion 52 telescopically receives the first end portion 46 of the piston 44 and forms therewith a single sealed and closed chamber 56, which is adapted to receive a compressible gas, such as nitrogen. The closed end portion 54 of the recoil tube 50 extends outwardly of the frame cylinder 36 and is joined to a support member 58. The support member 58 rotatably supports the track guiding idler wheel 18. A valve assembly 60 is positioned within the second end portion of the piston 44 and provides the means for charging and discharging gas into and out of the closed chamber 56. An open space or chamber 61 is formed between the cylinder 36 and the recoil tube 50.

The recoil system 28 further includes first and second guide members 62 and 64 which support and guide the first end portion 52 of the recoil tube 50. The guide members 62 and 64 are substantially similar and each has a guide portion 66 and an enlarged mounting portion 68. The first end portion 52 of the recoil tube 50 has first and second diametrically opposed guide slots 70 and 72, and the guide portions 66 of the guide members 62 and 64 cooperate with the guide slots 70 and 72 during linear movement of the recoil tube 50 and the idler wheel 18.

The first end portion 38 of the cylinder 36 has guiding and support members 74 on the internal walls of the cylinder. The guiding members 74 preferably include a bearing 75. The first end portion 38 also includes one or more seal assemblies 76 which serve to keep foreign material out of the chamber 61 between the cylinder 36 and the recoil tube 50.

A valve assembly 78, in the form of a pressure relief valve 78, is positioned in the wall of the cylinder 36 and is adapted to connect the chamber 61 with the atmosphere. The relief valve 78 will relieve pressure above a predetermined amount in chamber 61.

A stop assembly, in the form of plates 80 secured to the end of the recoil tube 50, limits the linear movement of the recoil tube 50. The stop plates 80 will contact the end wall 42 to limit movement in one direction and contact the guide members 62 and 64 to limit movement of the recoil tube 50 in the opposite direction.

The piston 44 has one or more seals 82 which seal the chamber 56. The second end portion 54 of the recoil tube 50 has a pair of vent holes 84 and 86 which extend completely through the walls of the tube 50. These vent holes 84 and 86 are normally on the back side of the piston seal 82. However, if the belt 24 should break, or come off the drive and idler wheels 16 and 18, the recoil tube will move forwardly or outwardly of the cylinder 36 until the vent holes 84 and 86 move to the forward side of the seal 82. At this position, pressure in the chamber 56 is vented through the holes 84 and 86, into the chamber 61, and then to the atmosphere through the valve 78.

Industrial Applicability

With reference to the drawings, the subject track recoil and tensioning mechanism is particularly useful for providing a recoil function for the idler wheel 18 of a belted track vehicle 10, and for maintaining proper tension on the flexible belt 24. In the embodiment illustrated, the belted vehicle 10 is supported and propelled by an undercarriage assembly 20, including a drive wheel 16 which frictionally drives a flexible track belt 24. The endless belt 24 encircles the drive wheel 16, and idler wheel 18 and a plurality of guide rollers 26. A roller frame assembly 22 supports the guide rollers and extends between the drive wheel 16 and the idler wheel 18 to the roller frame assembly and provides the recoil function for the idler wheel 18.

With particular reference to FIGS. 2 and 3, the belt tensioning and recoil system 18 is assembled to the frame assembly 22 as follows. The piston 44 is inserted into the open end portion 52 of the recoil tube 50 and the recoil tube 50 is then inserted into the open end portion 38 of the cylinder 36 until the piston 52 contacts the end wall 42. The guide members are then inserted through the walls of the cylinder 36 and mate with the guide slots 72 and 74 to position and center the recoil tube 50. The recoil tube is now substantially slidably secured within the cylinder 36. Since there is no pressure in the chamber 56, the recoil tube 50 can be easily moved into the cylinder chamber 61 in order to facilitate installation of the endless belt 24 around the drive wheel 16, the guide rollers 26, and the idler wheel 18.

With the belt 24 in place, the chamber 56 is pressurized by the valve assembly 60 with a compressible gas, such as nitrogen. As the pressure in the chamber 56 increases, the piston 44 engages the end wall 42 and the recoil tube 50 moves outwardly of the cylinder 36. This outward movement of the recoil tube 50 will tension the belt 24 between the drive wheel 16 and the idler wheel 18, which is secured to the recoil tube 50 and the support member 58. The pressure in the chamber is increased to a predetermined amount, which will properly tension the belt 24 for efficient frictional driving contact between the belt 24 and the drive wheel 16.

During operation of the vehicle 10, it is important that the tension force on the belt 24 remain substantially constant, since the belt 24 is driven by frictional engagement with the drive wheel 16. If the tension force should decrease and the belt 24 becomes slack, slippage would take place between the drive wheel 16 and the belt 24, with a resultant loss of power. A large increase in the tension force could result in damage to the belt or other related components. The tensioning and recoil system 28 prevents the tension force from increasing to a value that would cause such damage.

If foreign material becomes lodged between the drive wheel 16 and the belt 24, or between the idler wheel 18 and the belt 24, the belt tension will increase above the preset tension and the recoil tube 50 will move rearwardly into the chamber 61. This movement of the recoil tube 50 and the idler wheel 18 will temporarily reduce the increased belt tension. However, as the recoil tube 50 moves into the chamber 61, the piston 44 remains fixed and the recoil tube 50 moves relative to the piston 44. This reduces the volume in the chamber 56 and increases the pressure due to further compression of the gas in the chamber 56. When the foreign material is expelled from between the belt 24 and the wheels 16 or 18, the increased pressure in the chamber 56 pushes the recoil tube 50 and the idler wheel 18 back to its original position and the pressure in the chamber 56 returns to its original setting.

If, for any reason, such as seal failure, pressure builds up in the chamber 61, the pressure is vented to the atmosphere through the relief valve assembly 78. The setting of the valve 78 is normally low, about 30 pounds per square inch.

Other aspects, objects and advantages of the present invention can be obtained from a study of the drawings, the disclosure, and the appended claims.

I claim:

1. A tensioning and recoil system for controllably resisting linear movement of a track guiding wheel of a track type vehicle comprising:
    a frame member having a cylinder, said cylinder having a first open end portion and a second closed end portion having an end wall;
    a piston having a first open end portion and a second closed end portion and being positioned within said cylinder, said second end portion being in contact with said cylinder end wall;
    a recoil tube having a first open end portion and a second closed end portion, said recoil tube being positioned within said cylinder with said first open end portion telescopically receiving said piston first end portion and said second closed end portion extending outwardly of said frame cylinder, said piston and said recoil tube forming a single sealed and closed chamber, said chamber adapted to receive a compressible gas;
    a wheel support member joined to said recoil tube second end portion and adapted to rotatably support said track guiding wheel; and
    valve means for charging and discharging gas into and out of said closed chamber.

2. The tensioning and recoil system, as set forth in claim 1, wherein said valve means is associated with said second end portion of said piston.

3. The tensioning and recoil system, as set forth in claim 1, including first and second guide members, each guide member having a guide portion and a mounting portion.

4. The tensioning and recoil system, as set forth in claim 3, wherein said first end portion of said recoil tube has a pair of diametrically opposed guide slots and said guide members are adapted to cooperate with said guide slots during linear movement of said recoil tube.

5. The tensioning and recoil system, as set forth in claim 1, including guide and support means associated with said first end portion of said cylinder.

6. The tensioning and recoil system, as set forth in claim 5, wherein said guide and support means includes a bearing, said bearing being positioned between said first end portion of said cylinder and said second end portion of said recoil tube.

7. The tensioning and recoil system, as set forth in claim 1, including a pressure relief valve positioned in said cylinder and adapted to connect the interior of said cylinder to the atmosphere.

8. The tensioning and recoil system, as set forth in claim 1, including a vent hole in said first end portion of said recoil tube.

9. An undercarriage assembly for an endless self-laying track type vehicle having a friction drive wheel powered by said vehicle and an idler wheel spaced from said friction drive wheel comprising:
    a roller supporting frame having a first end portion connected to said drive wheel and a second end portion connected to said idler wheel;
    an endless flexible ground engaging belt encircling and frictionally engaging said drive and idler wheels, said belt adapted to be driven by frictional engagement with said friction drive wheel;
    a plurality of guide rollers secured to said frame and adapted to contact said belt between said drive wheel and said idler wheel; and
    a tensioning and recoil system having a cylinder, said cylinder having a first open end portion and a second closed end portion having an end wall, a piston having a first open end portion and a second closed end portion and being positioned within said cylinder with said second end portion being in contact with said end wall, a tubular member having an open end portion and a closed end portion and being positioned within said cylinder with said open end portion telescopically receiving said piston first end portion and said closed end portion extending outwardly of said cylinder and said piston and said tubular member forming a single sealed and closed chamber with said chamber adapted to receive a compressible gas; and
    a wheel support member secured to said tubular member closed end portion and adapted to rotatably support said idler wheel.

* * * * *

UNITED STATES PATENT AND TRADEMARK OFFICE
CERTIFICATE OF CORRECTION

PATENT NO. : 4,881,786

DATED : November 21, 1989

INVENTOR(S) : Andrew J. Tonsor et al.

It is certified that error appears in the above-identified patent and that said Letters Patent is hereby corrected as shown below:

On the front page of the patent, Item (75)
Inventors:  Andrew J. Tonsor
            Brian D. McFeeters Signed and Sealed this Eighteenth Day of June, 1991

Attest:

HARRY F. MANBECK, JR.

Attesting Officer

Commissioner of Patents and Trademarks